United States Patent [19]
Keel

[11] Patent Number: 5,648,616

[45] Date of Patent: Jul. 15, 1997

[54] EVALUATION ELECTRONICS OF A CORIOLIS MASS FLOW SENSOR

[75] Inventor: Guido Keel, Basel, Switzerland

[73] Assignee: Endress + Hauser Flowtec AG, Reinach, Switzerland

[21] Appl. No.: 514,914

[22] Filed: Aug. 14, 1995

[30] Foreign Application Priority Data

Aug. 16, 1994 [EP] European Pat. Off. ............. 94112759

[51] Int. Cl.$^6$ .................................................... G01F 1/84
[52] U.S. Cl. .................................................... 73/861.356
[58] Field of Search ..................... 73/861.354, 861.356, 73/861.357

[56] References Cited

U.S. PATENT DOCUMENTS

| | | | |
|---|---|---|---|
| 4,911,020 | 3/1990 | Thompson | 73/861.356 |
| 4,914,956 | 4/1990 | Young et al. | 73/861.356 |

FOREIGN PATENT DOCUMENTS

| | | |
|---|---|---|
| 0 300 301 | 1/1989 | European Pat. Off. . |
| 0 375 300 | 6/1990 | European Pat. Off. . |
| 5-52630 | 7/1993 | Japan . |
| WO93/03336 | 2/1993 | WIPO . |

OTHER PUBLICATIONS

Amberger et al., "Unmittelbare Messung des Massedurchflusses mit Hilfe der Coriolis–Kraft", Automatisierungstechnische Praxis atp. 30. Jahrgang. Heft May 1988, pp. 224–230 (English translation included).

Alan Young, Ph.D., "Coriolis Mass Flow Measurement", Measurements & Control, Sep., 1988, pp. 195–197.

*Primary Examiner*—Richard Chilcot
*Assistant Examiner*—Harshad Patel
*Attorney, Agent, or Firm*—Bose McKinney & Evans

[57] ABSTRACT

In the evaluation electronics of a Coriolis mass flow sensor, two preamplifiers provide output signals that are applied to a fixed gain amplifier and a variable gain amplifier. Outputs from the two gain amplifiers are applied to a difference stage having an output coupled to a changeover switch. The output of the fixed gain amplifier is also coupled to the changeover switch. A summing/integrating stage receives signals from the preamplifiers and is connected to a phase locked-loop followed by a phase measuring and phase adding stage having an output that provides first and second phase shifted signals. A first synchronous rectifier is clocked by the first phase shifted signal and has an output connected to a switch. A sequencer keeps the switch ON during an ON period and switches the changeover switch to the difference stage except during a short measurement period during which the sequencer activates a phase measurement. A second synchronous rectifier is clocked by the first phase shifted signal during the measurement period and by the second phase shifted signal during the ON period and has an output connected to an integrator. The input of a memory stage is connected the integrator during the measurement period. A divide stage has a dividend input, a first divisor input, and a second divisor input that are, during the ON period, connected to the integrator, the memory stage, and the phase-locked loop, respectively, and provides a signal proportional to the mass flow rate.

4 Claims, 1 Drawing Sheet

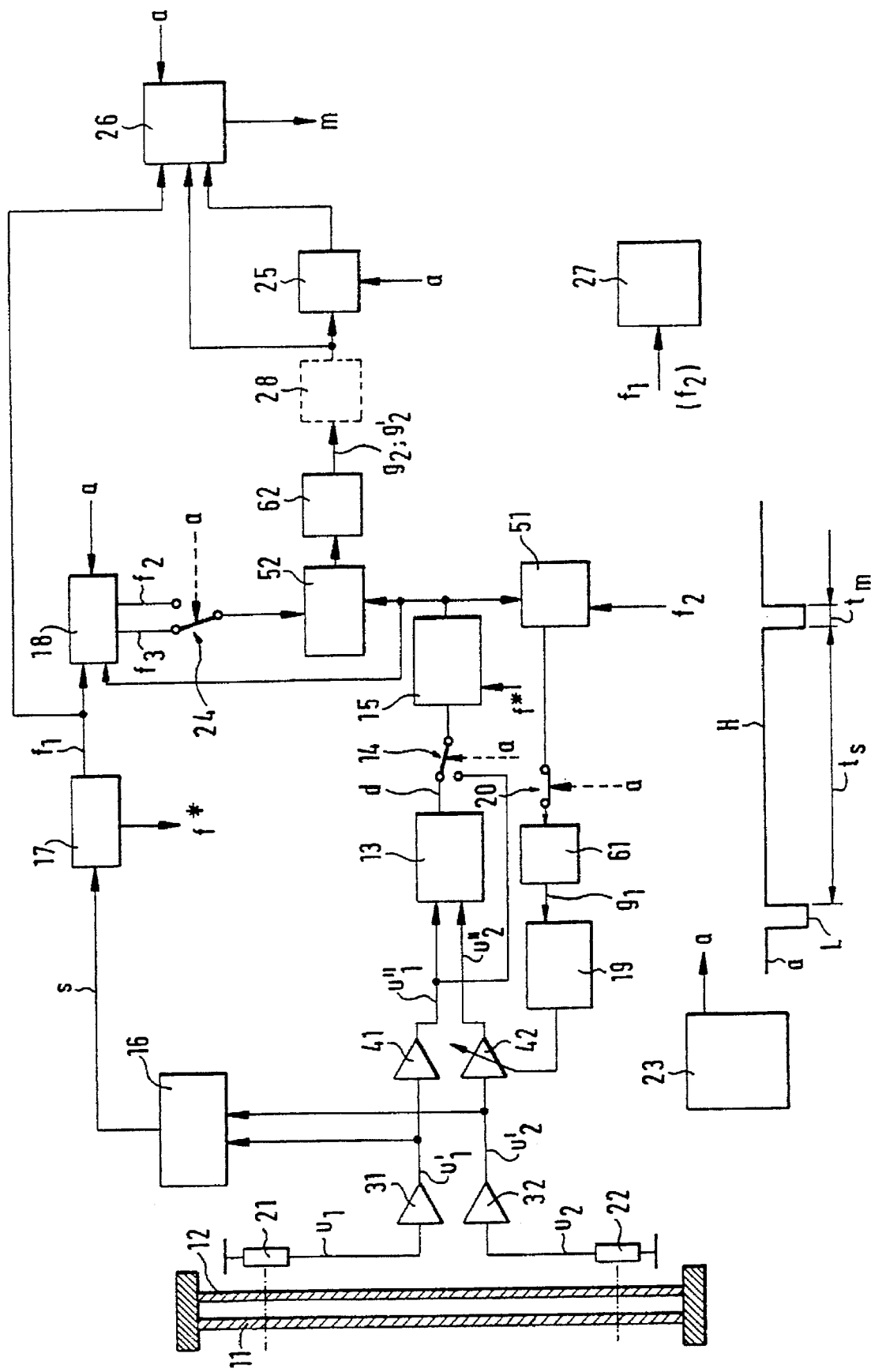

EVALUATION ELECTRONICS OF A CORIOLIS MASS FLOW SENSOR

FIELD OF THE INVENTION

The present invention relates to evaluation electronics of a Coriolis mass flow sensor with electrodynamic transducers.

BACKGROUND OF THE INVENTION

The evaluation electronics of a Coriolis mass flow sensor manufactured by the applicant are described in the journal "Automatisierungstechnische Praxis—atp", 1988, pages 224 to 230. This mass flow sensor has a first measuring tube vibrating at a vibration frequency and a second measuring tube vibrating at the same vibration frequency, the measuring tubes being traversed by a fluid to be measured, and a first optoelectronic transducer and a second optoelectronic transducer being positioned along the measuring tubes at a distance from each other in the direction of flow, the evaluation electronics comprising:

a light-emitting diode and a photodiode per optoelectronic transducer;

a difference stage for the output currents of the two transducers;

an amplifier succeeding the difference stage;

an adjustment stage
whose input is connected to the output of the amplifier,
whose output is connected via a switch to the photodiode of the second transducer, and
by means of which the amplitude of the output current of the second transducer is adjusted to be equal to the amplitude of the output current of the first transducer;

a sequencer which keeps the switch ON during an ON period except during a measurement period;

an amplitude-measuring stage having its input connected to the output of the difference stage;

a memory stage having its input connected to the output of the amplitude-measuring stage at least during the measurement period; and a processor stage whose output is proportional to mass flow rate.

The journal "Measurements & Control", September 1988, pages 195 to 197, describes the evaluation electronics of a Coriolis mass flow sensor having a first measuring tube vibrating at a vibration frequency and a second measuring tube vibrating at the same vibration frequency, the measuring tubes being traversed by a fluid to be measured, and a first electrodynamic transducer and second electrodynamic transducer being positioned along at least one of the measuring tubes at a distance from each other in the direction of flow, the evaluation electronics comprising:

a first, fixed-gain amplifier for the signal from the first transducer;

a second, variable-gain amplifier for the signal from the second transducer;

a difference amplifier for the output signals from the two amplifiers;

an active filter succeeding the difference amplifier and serving to eliminate measurement errors which are caused by variations in the density of fluid, by the vibration frequency itself, and by the excitation of the measuring tubes;

a summing amplifier for the output signals from the two amplifiers;

a first lock-in amplifier, locked onto the vibration frequency, at the output of the active filter;

a second lock-in amplifier, locked onto the vibration frequency, at the output of the summing amplifier;

a first voltage-to-frequency converter at the output of the first lock-in amplifier and a second voltage-to-frequency converter at the output of the second lock-in amplifier;

a first counter at the output of the first voltage-to-frequency converter and a second counter at the output of the second voltage-to-frequency converter; and a divide stage
whose dividend input is connected to the output of the first counter,
whose divisor input is connected to the output of the second counter, and
whose output signal is proportional to mass flow rate.

It is an object of the invention to provide improved evaluation electronics for Coriolis mass flow sensors comprising electrodynamic transducers, so that at least an accuracy of 0.005% of the measuring-range limit value (e.g., at a fluid velocity of 10 m/s) and an accuracy of 0.15% of the measured value are attainable. These values also mean that a fluid velocity of 0.5 mm/s must still be measurable. The phase difference to be measured between the signals from the two electrodynamic transducers ranges between approximately $4 \cdot 10^{-5}$° and approximately 0.5° at vibration-frequency values between approximately 500 Hz and approximately 1 kHz. The phase measurement must therefore be made with a resolution of approximately $2 \cdot 10^{-10}$ seconds.

SUMMARY OF THE INVENTION

Accordingly, the invention provides evaluation electronics of a Coriolis mass flow sensor having a first measuring tube vibrating at a vibration frequency and a second measuring tube vibrating at the same vibration frequency, the measuring tubes being traversed by a fluid to be measured, and a first electrodynamic transducer and a second electrodynamic transducer being positioned along at least one of the measuring tubes at a distance from each other in the direction of fluid flow, the evaluation electronics comprising:

a first preamplifier for the signal from the first transducer;

a second preamplifier for the signal from the second transducer;

a first, fixed-gain amplifier for the output signal from the first preamplifier;

a second, variable-gain amplifier for the output signal from the second preamplifier;

a difference stage for the output signals from the two amplifiers;

a changeover switch
whose first input is connected to the output of the difference stage, and
whose second input is connected to the output of the first amplifier;

a variable-cutoff-frequency low-pass filter
whose transmission begins to decrease at the vibration frequency of the measuring tubes, and
whose input is connected to the output of the first changeover switch;

a summing/integrating stage for the output signals from the two preamplifiers;

a phase-locked loop whose input is connected to the output of the summing/integrating stage, and whose output signal is a first vibration-frequency signal;

a phase-measuring and phase-adding stage
whose first input is supplied with the first vibration-frequency signal,
whose second input is supplied with the output signal from the low-pass filter,
whose first output provides a second vibration-frequency signal shifted in phase by an amount equal to the phase shift of the low-pass filter, and
whose second output provides a third vibration-frequency signal shifted in phase by an amount equal to said phase shift plus 90°;

a first synchronous rectifier clocked by the second vibration-frequency signal and fed with the output signal from the low-pass filter;

a switch having its input connected to the output of the first synchronous rectifier;

an adjustment stage for adjusting the gain of the second amplifier and having its input connected via a first integrator to the output of the switch;

a sequencer which keeps the switch ON during an ON period and the output of the changeover switch connected to the first input of the changeover switch except during a measurement period which is short compared with the ON period and during which the sequencer activates the phase measurement of the phase-measuring and phase-adding stage;

a second synchronous rectifier which is clocked by the second vibration-frequency signal during the measurement period and by the third vibration-frequency signal during the ON period, and which is supplied with the output signal from the low-pass filter;

a second integrator having its input connected to the output of the second synchronous rectifier;

a memory stage having its input connected to the output of the second integrator during the measurement period at the most; and a divide stage
wherein during the ON period
a dividend input is connected to the output of the second integrator,
a first divisor input is connected to the output of the memory stage, and
a second divisor input is connected to the output of the phase-locked loop, and
whose output signal is proportional to mass flow rate.

In a preferred embodiment of the invention, the low-pass filter is a switched-capacitor filter whose clock signal is generated by the phase-locked loop, and whose clock frequency is an integral multiple of the vibration frequency.

In another preferred embodiment of the invention, there is provided a measuring stage for measuring the density of the fluid whose input is supplied with the first or second vibration-frequency signal.

In a further preferred embodiment of the invention, the output of the second synchronous rectifier is coupled directly to an analog-to-digital converter, and the amplitude-measuring stage, the memory stage, and the divide stage are digital circuits.

BRIEF DESCRIPTION OF THE DRAWING

The invention will become more apparent from the following description of the single figure of the accompanying drawing, which shows one embodiment of the invention in a block diagram.

DETAILED DESCRIPTION OF THE DRAWING

The evaluation electronics shown in block-diagram form in FIG. 1 are designed for a mass flow sensor based on the Coriolis principle, of which a first measuring tube 11 vibrating at a vibration frequency and a second measuring tube 12 vibrating at the same vibration frequency are shown schematically as the parts which are essential for the operation of the sensor. This equality of the vibration frequencies requires that the dimensions and mechanical properties of the measuring tubes should be as identical as possible. Since the two measuring tubes 11, 12 are installed, preferably parallel to each other, in a conduit (not shown), e.g., by means of flanges or screw connections, a fluid to be measured, such as water, milk, oil, etc., flows through them during operation.

The measuring tubes 11, 12 are so excited by a driver circuit (not shown) as to vibrate in phase opposition at their resonance frequency, the vibration frequency f, which depends on the properties of the fluid (particularly mass and density). The driver circuit can be implemented as a phase-locked loop, for example, so that the instantaneous resonance frequency adjusts itself automatically, as is described in applicant's U.S. Pat. No. 4,801,897.

A first electrodynamic transducer 21 and a second electrodynamic transducer 22 are positioned along the measuring tube 12 at a distance from each other in the direction of fluid flow. The transducers may also be arranged to pick up the vibrations at equal points of the two measuring tubes 11, 12. Each transducer consists of a permanent magnet and a coil which move relative to each other in response to the vibrations.

Each transducer therefore provides an alternating voltage proportional to the velocity of the measuring tube, i.e., a voltage $u=U \cdot \sin\Omega t$, whose amplitude U is proportional to the amplitude of the vibration of the measuring tube, and whose frequency $1/t$ is equal to the frequency f of the measuring-tube vibration, with $\Omega=2\pi f$. As used in this application, an upper case "U" (e.g. U, U', U", etc.) is used to designate a mathematical representation of the maximum value of a periodic function or signal.

In operation, with fluid flowing, the alternating voltage $u_1$ of the transducer 21 is shifted in phase by an amount $\phi$ with respect to the alternating voltage $u_2$ of the transducer 22; therefore, assuming that the transducers 21,22 are spaced from the center of the measuring tube 12 by the same distance, with the phase $\phi=0$ assigned to this center:

$$u_1 = U_1 \cdot \sin(\Omega t - \phi/2) \tag{1}$$

$$u_2 = U_2 \cdot \sin(\Omega t + \phi/2) \tag{2}$$

The signal $u_1$ from the first transducer 21 and the signal $u_2$ from the second transducer 22 are applied to a first preamplifier 31 and a second preamplifier 32, respectively. Each of these preamplifiers has a high input resistance, so that practically no current flows in the transducers which could prestress the measuring tubes and thus adversely affect their vibration behavior. The preamplifiers do not change the phase relationship between the transducer signals.

The output signal $u'_1 = U'_1 \cdot \sin(\Omega t - \phi/2)$ from the first preamplifier 31 is applied to a first, fixed-gain amplifier 41, and the output signal $u'_2 = U'_2 \cdot \sin(\Omega t + \phi/2)$ from the second preamplifier 32 to a second, variable-gain amplifier 42. The signals $u'_1$, $u'_2$ may differ by a maximum of ±10%.

The gain of the second amplifier 42 is automatically so adjusted that the amplitudes $U''_1$, $U''_2$ of the output signals $u''_1$, $u''_2$ from the two amplifiers 41, 42 are equal: $U''_1=U''_2=U''$. The gain adjustment will be explained below. The amplifiers 41, 42 are preferably current-feedback operational amplifiers, whose bandwidth is independent of the instantaneous gain. The output signals $U''\cdot\sin(\Omega-\phi/2)t$ and $U''\cdot\sin(\Omega-\phi/2)t$ from the two amplifiers 41, 42 are applied, respectively, to the minuend and subtrahend inputs of a difference stage 13. The output of the latter therefore provides a difference signal d:

$$d = U''\cdot\sin(\Omega-\phi/2)t - U''\cdot\sin(\Omega-\phi/2)t \qquad (3)$$

$$d = U''\cdot[\sin(\phi/2)\cdot\cos\Omega t+\cos(\phi/2)\cdot\sin\Omega t+\sin(\phi/2)\cdot\cos\Omega t-\cos(\phi/2)\cdot\sin\Omega t]$$

$$d = 2U''\cdot\sin(\phi/2)\cdot\cos\Omega t. \qquad (4)$$

Since for very small values of $\phi$, as always, $$\sin\phi \approx \phi,$$

it follows that $$d = 2U''\cdot(\phi/2)\cdot\cos\Omega t = U''\cdot\phi\cdot\cos\Omega t. \qquad (5)$$

It is apparent that the amplitude $U''\cdot\phi$ of the difference signal d is only proportional to the phase $\phi$ (since $U''$ is maintained constant), and that the phase of the difference signal differs from that of each of the transducer signals $u_1$, $u_2$ by practically 90°, since, as assumed above, $\phi$ is very small.

For the mass flow rate m, the following relation holds:

$$m \sim \phi/\Omega \qquad (6)$$

The output of the difference stage 13, which may also amplify the difference signal, is coupled to the first input of a first changeover switch 14, whose second input is connected to the output of the first amplifier 41. Thus, either the difference signal d or the signal $u''_1$ can be transferred to the output of the first changeover switch 14.

The input of a variable-cutoff-frequency low-pass filter 15 is connected to the output of the first changeover switch 14. The low-pass filter 15 is preferably implemented in switched-capacitor technology and is at least of the fourth order. In that case, the switched-capacitor low-pass filter must be preceded by an anti-aliasing filter and followed by a smoothing filter.

Switched-capacitor filters, as is well known, are clocked filters; therefore, the clock frequency f* of the clocked low-pass filter 15 is an integral multiple of the vibration frequency f. Through this "tieing" of the clock frequency f* to the vibration frequency f, the cutoff frequency of the clocked low-pass filter 15 is locked to, and varies with, the vibration frequency f.

The decrease of the transmission of the low-pass filter 15 begins at the vibration frequency f of the measuring tubes and is sufficiently steep, so that interference signals originating from the pipe (vibrations caused, for example, by impacts on the pipe) or the moving fluid (cavitation) can be optimally suppressed.

The output signals $u'_1$, $U'_2$ from the two preamplifiers 31, 32 are applied to a summing/integrating stage 16, whose output thus provides a signal s as follows:

$$s = u'_1 + u'_2 = U'_1\cdot\sin(\Omega t - \phi/2) + U'_2\cdot\sin(\Omega t + \phi/2) \qquad (7)$$

$$s = \int U'\cdot(\sin\Omega t)dt = -(U'/\Omega)\cdot\cos\Omega t$$

where $U'=U'_1=U'_2$.

The signal s thus has the phase of the center of the measuring tube 12 and the vibration frequency f of the measuring tube.

The output of the summing/integrating stage 16 is coupled to the frequency input of a phase-locked loop 17, which provides a first vibration-frequency signal $f_1$ at its output; it thus serves to provide decoupling between, but synchronize the frequencies of, the signals s and $f_1$. The vibration-frequency signal $f_1$ is preferably a square-wave signal with a unity mark-to-space ratio.

In principle, it would be sufficient to provide a pure summing stage or apply only one of the two signals $u'_1$, $u'_2$ to the phase-locked loop 17, but the use of the summing/integrating stage 16 has a dual advantage: On the one hand, interference signals originating from the pipe or the moving fluid are attenuated by the integration, and on the other hand, the output signal from the summing/integrating stage 16 can also be used to control an amplitude control circuit which maintains the mechanical vibration amplitude of the measuring tubes constant regardless of variations in their vibration frequency. This amplitude control circuit can be part of the above-mentioned measuring tube driver circuit.

The first vibration-frequency signal $f_1$ is applied to the first input of a phase-measuring and phase-adding stage 18, whose second input receives the output signal from the low-pass filter 15. The phase-measuring and phase-adding stage 18 provides at its first output a second vibration-frequency signal $f_2$ shifted in phase with respect to its input signal $f_1$ by an amount equal to the phase shift $\delta\phi$ introduced by the low-pass filter 15, and at its second output a third vibration-frequency signal $f_3$ shifted with respect to $f_1$ by $\delta\phi+90°$. Both vibration-frequency signals are preferably square-wave signals with a unity mark-to-space ratio.

The output of the low-pass filter 15 is applied to a first synchronous rectifier 51, which is clocked by the second vibration-frequency signal $f_2$, and whose output is applied to a first integrator 61 through a switch 20.

Generally speaking, a synchronous rectifier is an amplifier whose gain v is switched periodically by a control signal between +v and −v, or in other words: A synchronous rectifier is a multiplier whose multiplication factor is switched periodically by a control signal between +1 and −1.

To understand the invention, two limiting cases of the operation of synchronous rectifiers are important, namely:

limiting case 1 of a sine-wave input signal of frequency F and of an in-phase control signal of the same frequency F and with a unity mark-to-space ratio (=limiting case of equal phase), and limiting case 2 of a cosine-wave input signal of frequency F, i.e., an input signal differing in phase from the sine-wave input signal by 90°, but for the case of a control signal of the same frequency F and with a unity mark-to-space ratio which is in phase with the sine-wave input signal (=limiting case of orthogonal phase).

In the limiting case of equal phase, the synchronous rectifier provides an output signal like a conventional full-wave or bridge rectifier. Thus, the integrator 61 following the synchronous rectifier 51 delivers practically a direct voltage $g_1$.

In the limiting case of orthogonal phase, the synchronous rectifier provides an output signal consisting of linked curve portions of the cosine-wave signal which each begin with the maximum of the cosine-wave signal and end with the minimum of the latter. The subsequent integrator thus delivers a direct voltage whose value is zero.

Since, as can be easily shown, if the amplitudes $U''_1$, $U''_2$ of the signals $u''_1$, $u''_2$ from the two amplifiers 41, 42 differ, a sine-containing term dependent on the two amplitudes $U''_1$, $U''_2$ occurs in the equation corresponding to Equation (4), the output from the first integrator 61 is practically a direct voltage $g_1$, which becomes zero when these amplitudes are equal, because the sine-containing term is then eliminated and the cosine term according to Equation (4) also becomes zero, as explained above for the limiting case of orthogonal phase.

The direct voltage $g_1$ is applied to a stage 19 for adjusting the gain of the second amplifier 42. Thus, the circuit consisting of amplifier 42, difference stage 13, first changeover switch 14, low-pass filter 15, synchronous rectifier 51, switch 20, integrator 61, and adjustment stage 19 acts as an automatic gain control circuit, with a suitable reference signal being applied to or formed in the adjustment stage 19. The automatic gain control circuit controls the gain of the amplifier 42 so that the amplitudes of the output signals $u''_1$, $u''_2$ are practically equal, as was explained above.

A sequencer 23 provides a signal a which keeps the switch 20 ON during an ON period $t_s$ and the output of the changeover switch 14 connected to the first input of the latter during a measurement period $t_m$ which is short compared to the ON period $t_s$, and during which the output of the changeover switch 14 is connected to the second input of the latter. Furthermore, during the measurement period, the phase measurement by the phase-measuring and phase-adding stage 18 is activated, so that the phase shift $\delta\phi$ of the low-pass filter 15 is updated at the pulse repetition rate of the signal a.

The output signal from the low-pass filter 15 is also applied through a second changeover switch 24 to a second synchronous rectifier 52, which is clocked by the third vibration-frequency signal $f_3$ during the ON period $t_s$ and by the second vibration-frequency signal $f_2$ during the measurement period $t_m$.

The second synchronous rectifier 52 is followed by a second integrator 62 which integrates over at least one full period of the signal $f_2$ or $f_3$. The integrator 62 thus provides a direct voltage $g_2$ which is strictly proportional to the amplitude of the input signal.

Since, during the ON period $t_s$, the low-pass filter 15 processes the signal d, which, according to Equation (5), is a cosine-wave signal, and since the second synchronous rectifier 52 is clocked during the ON period $t_s$ by the third vibration-frequency signal $f_3$, which is a cosine-wave signal shifted in phase by $\delta\phi$ (cf. its above definition), the aforementioned limiting case of equal phase is present. The second integrator 62 therefore provides the direct voltage $g_2$, which is proportional to the amplitude $U''\cdot\phi$ according to Equation (5).

Since, on the other hand, during the measurement period $t_m$, the low-pass filter 15 processes the signal $u''_1$, which, according to Equation (1), is a sine-wave signal, and since the second synchronous rectifier 52 is clocked during the measurement period $t_m$ by the second vibration-frequency signal $f_2$, which is a sine-wave signal shifted in phase by $\delta\phi$, the limiting case of equal phase is again present. The second integrator 62 therefore provides a direct voltage $g_2'$ which is proportional to the amplitude $u''_1$ and is thus a measure of the vibration amplitude of the measuring tube 12.

Through the clocking with the two signals $f_2$, $f_3$, which differ in phase by 90°, components in the output of the low-pass filter 15 which are separated in phase by 90° are reliably suppressed.

If the two changeover switches 14, 24 and the switch 20 are implemented with electronic components, the sequencer 23 will generate a signal a, e.g., a voltage, with a first level H corresponding to the ON period $t_s$ and sufficient to turn on the two switches 14, 24 and the switch 20, e.g., a more positive level. Only during the short measuring period $t_m$ will the signal a be at a second level L sufficient to change the changeover switches 14, 24 to their other positions and to turn off the switch 20, e.g., a more negative level. The ON period $t_s$ is 2 s and the measurement period $t_m$ 20 µs, for example.

The input of a memory stage 25 is connected to the output of the second integrator 62 during the measurement period $t_m$ at the most. Since, as explained above, the direct voltage $g_2$ is then applied at the input, its value, i.e., the vibration amplitude of the measuring tube 12, so to speak, is stored by the memory stage 25.

Finally, during a portion of the ON period $t_s$, a dividend input of a divide stage 26 is connected to the output of the second integrator 62, and first and second divisor inputs of this stage are connected to the outputs of the memory stage 25 and the phase-locked loop 17, respectively. The second divisor input only evaluates the frequency information; this can be implemented, for example, by providing a frequency-to-voltage converter.

The output of the divide stage 26 is thus proportional to the mass flow rate m.

In a preferred embodiment of the invention, a measuring stage 27 for determining the density of the fluid is provided, whose input is supplied with the first or second vibration-frequency signal $f_1$, $f_2$. As is well known, the density of the fluid can be determined from the vibration frequency f of the measuring tubes, and the signals $f_1$, $f_2$, as explained, have the same frequency.

If the memory stage 25 and the divide stage 26 are to be implemented as digital circuits, e.g., by forming part of a microprocessor, the output of the second integrator 62 must be coupled directly to an analog-to-digital converter 28; this is indicated in the figure by dashed lines. This microprocessor may also perform the functions of still further subcircuits, such as that of the above-mentioned frequency-to-voltage converter.

I claim:

1. Evaluation electronics of a Coriolis mass flow sensor having a first measuring tube vibrating at a vibration frequency and a second measuring tube vibrating at the same vibration frequency, the measuring tubes being traversed by a fluid to be measured, and a first electrodynamic transducer and a second electrodynamic transducer being positioned along at least one of the measuring tubes at a distance from each other in the direction of fluid flow, the evaluation electronics comprising:

a first preamplifier for the signal from the first transducer;

a second preamplifier for the signal from the second transducer;

a first, fixed-gain amplifier for the output signal from the first preamplifier;

a second, variable-gain amplifier for the output signal from the second preamplifier;

a difference stage for the output signals from the two amplifiers;

a changeover switch whose first input is connected to the output of the difference stage, and whose second input is connected to the output of the first amplifier;

a variable-cutoff-frequency low-pass filter whose transmission begins to decrease at the vibration frequency of the measuring tubes, and whose input is connected to the output of the changeover switch;

a summing/integrating stage for the output signals from the two preamplifiers;

a phase-locked loop whose input is connected to the output of the summing/integrating stage, and whose output signal is a first vibration-frequency signal;

a phase-measuring and phase-adding stage whose first input is supplied with the first vibration-frequency signal, whose second input is supplied with the output signal from the low-pass filter, whose first output provides a second vibration-frequency signal shifted in phase by an amount equal to the phase shift of the low-pass filter, and whose second output provides a third vibration-frequency signal shifted in phase by an amount equal to said phase shift plus 90°;

a first synchronous rectifier clocked by the second vibration-frequency signal and fed with the output signal from the low-pass filter;

a switch having its input connected to the output of the first synchronous rectifier;

an adjustment stage for adjusting the gain of the second amplifier and having its input connected via a first integrator to the output of the switch;

a sequencer which keeps the switch ON during an ON period and the output of the changeover switch connected to the first input of the changeover switch except during a measurement period which is short compared with the ON period and during which the sequencer activates the phase measurement of the phase-measuring and phase-adding stage;

a second synchronous rectifier which is clocked by the second vibration-frequency signal during the measurement period and by the third vibration-frequency signal during the ON period, the second synchronous rectifier being supplied with the output signal from the low-pass filter;

a second integrator having its input connected to the output of the second synchronous rectifier;

a memory stage having its input connected to the output of the second integrator during the measurement period at the most; and a divide stage wherein during the ON period a dividend input is connected to the output of the second integrator, a first divisor input is connected to the output of the memory stage, and a second divisor input is connected to the output of the phase-locked loop, and whose output signal is proportional to mass flow rate.

2. Evaluation electronics as claimed in claim 1 wherein the low-pass filter is a switched-capacitor filter having a clock signal that is generated by the phase-locked loop, and whose clock frequency is an integral multiple of the vibration frequency.

3. Evaluation electronics as claimed in claim 1, comprising a measuring stage for measuring the density of the fluid whose input is supplied with the first or second vibration-frequency signal.

4. Evaluation electronics as claimed in claim 1 wherein the output of the second synchronous integrator is coupled directly to an analog-to-digital converter, and wherein the memory stage and the divide stage are digital circuits.

* * * * *